United States Patent Office 3,418,301
Patented Dec. 24, 1968

3,418,301
ETHYLENE/HALOETHYL ESTER COPOLYMERS
Ben E. Spivey, Lake Jackson, Tex., assignor to The Dow Chemical Company, Midland, Mich., a corporation of Delaware
No Drawing. Filed May 7, 1965, Ser. No. 454,178
3 Claims. (Cl. 260—86.7)

ABSTRACT OF THE DISCLOSURE

Ethylene copolymers prepared by polymerizing ethylene with halo alkyl acrylates or methacrylates. These are useful as adhesives and can be used to make laminated wood, paper or glass articles.

---

The present invention relates to ethylene copolymers and more particularly to copolymers of ethylene and a haloethyl ester of an acrylic acid.

According to the present invention ethylene copolymers are prepared by polymerizing ethylene with the haloethyl esters of acrylic acids of the formula

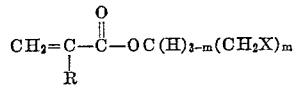

wherein R is hydrogen or the methyl radical, X is halogen, and preferably chlorine, and $m$ is an integer from 1 to 2.

Typical esters useful for the purposes of the present invention include 2-chloroethyl acrylate and methacrylate, 2-bromoethyl acrylate and methacrylate, and 1-(bromomethyl)-2-bromoethyl acrylate and methacrylate, 1-chloromethyl)-2-chloroethyl acrylate and mixtures thereof.

The haloethyl esters of acrylic acids employed in the present invention may be prepared by reacting the acid, acyl halide, or anhydride with the desired alcohol. Still another method of forming the esters is by reacting a lower alkyl ester of the acrylic acid with the 2-haloethyl alcohol in an ester interchange, a catalyst being used to promote the interchange.

The conditions under which the polymerizable haloethyl derivatives are formed are mild: for example, a 2-haloethyl alcohol may be reacted with the acrylic acid described herein in a low-boiling solvent such as benzene on a water bath or an oil bath at temperatures ranging from about 80 to 150° C. The reaction is conducted under a reflux condenser to prevent volatilization of the solvent and/or the reaction constituents. Also, a catalyst such as p-toluene sulfonic acid is generally present to promote reaction, and a polymerization inhibitor such as phenothiazine is commonly employed to avoid polymerization of the ester during reaction. The 2-haloethyl alcohol and the acrylic acid may be reacted in various proportions, but generally the reactants will be employed in approximate equimolar amounts.

The ethylene/acrylic acid haloester copolymer compositions of the present invention are obtained by reacting a major proportion of ethylene i.e. from about 60 to about 97 percent by weight with about 3 to about 40 percent by weight of the acrylic acid haloester.

The copolymers can be prepared by methods known to the art, for example, by polymerizing mixtures of ethylene and one or more of the specified acrylic acid haloethyl esters either in tubular or autoclave reactors at pressures from about 10,000 to 50,000 pounds per square inch, or higher, and at temperatures from about 100° C. to about 300° C. using, at catalytically effective concentrations, free radical producing polymerization catalysts as azo catalysts like α,α-azobisisobutyronitrile and peroxygen-type catalysts such as diethyl peroxide, hydrogen peroxide, di-tertiary butyl peroxide, persuccinic acid, lauroyl hydroperoxide, tetrahydronaphthalene peroxide, alkali metal, alkaline earth metal or ammonium persulfates, perborates, percarbonates, and the like. Such catalysts usually are used in the range from about 0.01 percent to about 0.2 percent, based on the weight of the monomers. Other methods of catalysis, such as irradiation by ultraviolet, X-ray and gamma rays as well as by radiation from linear accelerators, reasonant transformers, and the like, may be used if desired. To facilitate the introduction of the acrylic acid haloethyl ester into the reactor, the ester is desirably dissolved in a suitable solvent such as benzene.

The ethylene/acrylic acid haloethyl ester copolymers of the present invention have molecular weights ranging from about 1,000 to 60,000 and a halogen content of about 0.07 percent to about 10 percent.

The ethylene copolymers of the present invention either alone or modified with fillers, synthetic resins and plasticizers find uses as molding compositions for the manufacture of useful films and coatings.

The copolymers are cross-linkable and are highly useful as adhesives and may be used as the resinous binding ingredient in the production of laminate articles of construction such as bound layers of wood, paper, glass, and the like.

To illustrate the manner in which the invention may be carried out, the following examples are given. It is to be understood, however, that the examples are for the purpose of illustration and the invention is not to be regarded as limited to any of the specific materials or conditions recited therein. Unless otherwise stated, all percentages cited in the examples below are based on weight.

EXAMPLE

Ethylene and 2-chloroethyl acrylate (CEA) were copolymerized in a series of runs identified and further described in the table below. The runs were carried out in a continuous manner in a 5-liter pressure autoclave stirred at 1,200 r.p.m. at a temperature between 202° C. and 209° C. and a pressure between 18,000 and 21,000 p.s.i.

The table shows the average rate of feed of ethylene in pounds per hour, the percentage amount of the 2-chloroethyl acrylate comonomer (added as a 25 percent solution in benzene) introduced into the ethylene feed as well as the concentration of the catalyst, α,α-azobisisobutyronitrile, introduced into the autoclave. The amount of 2-chloroethyl acrylate found in each copolymer product produced is also shown.

The table further shows properties of the resulting copolymer products.

Melt and index is measured by ASTM D–1238–57T.

Tensile and yield strength in p.s.i. and elongation in percent of original length at break are measured by ASTM D–638–58T on specimens cut using die "B" of ASTM D–412–51T pulled at 10 inches per minute.

Rigidity is by ASTM D–747–58T.

Hardness is by Shore C method.

Density is by Archimedes Bouyancy Principle.

TABLE

| Run No. | 1 | 2 | 3 | 4 | 5 |
|---|---|---|---|---|---|
| Ethylene Feed Rates, lbs./hr. | 37.0 | 37.0 | 37.0 | 35.0 | 36.0 |
| Percent CEA in Feed | 0.75 | 1.33 | 2.10 | 2.82 | 3.04 |
| Percent CEA in Product | 10.3 | 11.2 | 15.5 | 15.6 | 22.2 |
| Percent Catalyst | 3 | 3 | 3 | 4 | 3 |
| Melt Index | 0.7 | 3.35 | 30.1 | 1,000 | 47.0 |
| Tensile | 1,675 | 1,290 | 840 | 730 | 585 |
| Yield | 1,055 | 890 | 700 | 705 | 350 |
| Elongation | 615 | 605 | 580 | 155 | 575 |
| Rigidity×10⁻⁴ | 1.18 | 0.76 | 0.75 | 0.72 | 0.37 |
| Density | 0.9436 | 0.9440 | 0.9633 | 0.9582 | 0.9751 |

Results similar to the foregoing may also be obtained when any of the other 2-haloalkyl esters of acrylic acid or methacrylic acid herein described are copolymerized with ethylene in place of the esters enumerated above.

What is claimed is:

1. An adhesive copolymer of about 60 percent to about 97 percent by weight of ethylene and about 3 to about 40 percent by weight of a haloethyl ester of an acrylic acid, said ester having the following formula

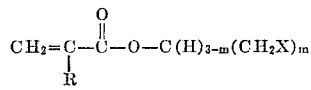

wherein R is selected from the group consisting of hydrogen and a methyl radical, X is halogen selected from the group consisting of bromine and chlorine, and $m$ is an integer from 1 to 2.

2. The copolymer of claim 1 wherein X is chlorine.
3. The copolymer of claim 1 wherein the ester is 2-chloroethyl acrylate.

References Cited
UNITED STATES PATENTS 2,594,560   4/1952   Howard _____ 260—86.7

JOSEPH L. SCHOFER, *Primary Examiner.*

HARRY WONG, *Assistant Examiner.*

U.S. Cl. X.R.

161—204, 250; 204—154, 158; 260—80.81, 486, 897, 901